US012236615B2

(12) United States Patent
Kang et al.

(10) Patent No.: US 12,236,615 B2
(45) Date of Patent: Feb. 25, 2025

(54) IMAGE PROCESSING METHOD AND APPARATUS

(71) Applicant: SAMSUNG ELECTRONICS CO., LTD., Suwon-si (KR)

(72) Inventors: Dongwoo Kang, Seoul (KR); Jingu Heo, Yongin-si (KR); Byong Min Kang, Yongin-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/491,506

(22) Filed: Oct. 20, 2023

(65) Prior Publication Data

US 2024/0046487 A1 Feb. 8, 2024

Related U.S. Application Data

(63) Continuation of application No. 17/728,308, filed on Apr. 25, 2022, now abandoned, which is a (Continued)

(30) Foreign Application Priority Data

Aug. 26, 2019 (KR) ........................ 10-2019-0104570

(51) Int. Cl.
*G06T 7/20* (2017.01)
*G06T 7/00* (2017.01)
(Continued)

(52) U.S. Cl.
CPC ............ *G06T 7/248* (2017.01); *G06T 7/0014* (2013.01); *G06T 7/215* (2017.01); *G06T 2207/30041* (2013.01); *G06T 2207/30201* (2013.01)

(58) Field of Classification Search
CPC .... G06V 20/597; G06V 20/59; G06V 40/174; G06T 2207/30201
See application file for complete search history.

(56) References Cited

U.S. PATENT DOCUMENTS 7,676,063 B2 3/2010 Cohen et al.
9,779,300 B2 10/2017 Ronnecke et al.
(Continued)

FOREIGN PATENT DOCUMENTS

CN 108141544 A 6/2018
EP 2157547 A2 2/2010
(Continued)

OTHER PUBLICATIONS

Communication dated Jan. 19, 2021, issued by the European Patent Office in counterpart European Application No. 20185149.0.
(Continued)

*Primary Examiner* — Sam Bhattacharya
(74) *Attorney, Agent, or Firm* — Sughrue Mion, PLLC

(57) ABSTRACT

An image processing method includes acquiring an image frame; tracking a face region of a user based on first prior information obtained from at least one previous frame of the image frame; based on a determination that tracking of the face region based on the first prior information has failed, setting a scan region in the image frame based on second prior information obtained from the at least one previous frame; and detecting the face region in the image frame based on the scan region.

17 Claims, 7 Drawing Sheets

Related U.S. Application Data continuation of application No. 16/890,114, filed on Jun. 2, 2020, now Pat. No. 11,315,261.

(51) Int. Cl.
    *G06T 7/215*     (2017.01)
    *G06T 7/246*     (2017.01)

(56) References Cited

U.S. PATENT DOCUMENTS

| | | | |
|---|---|---|---|
| 10,855,965 B1* | 12/2020 | Jiao | H04N 13/383 |
| 10,895,741 B2* | 1/2021 | Chou | G09G 5/373 |
| 2006/0202843 A1* | 9/2006 | Ota | G06V 10/145 |
| | | | 340/576 |
| 2007/0013868 A1* | 1/2007 | Pugach | A61B 3/0091 |
| | | | 351/209 |
| 2009/0303342 A1 | 12/2009 | Corcoran et al. | |
| 2016/0066781 A1 | 3/2016 | Thompson et al. | |
| 2019/0034700 A1 | 1/2019 | Xie | |
| 2020/0175258 A1 | 6/2020 | Kang et al. | |

FOREIGN PATENT DOCUMENTS

| | | |
|---|---|---|
| JP | 11-86005 A | 3/1999 |
| JP | 2000-070225 A | 3/2000 |
| JP | 2002-8020 A | 1/2002 |
| JP | 2010-128961 A | 6/2010 |
| JP | 2018-181157 A | 11/2018 |
| KR | 10-2001-0001021 A | 1/2001 |
| KR | 10-2010-0121817 A | 11/2010 |
| KR | 10-2018-0086716 A | 8/2018 |

OTHER PUBLICATIONS

Kang et al., "Pupil Detection and Tracking for AR 3D under Various Circumstances," Society for Imaging Science and Technology, IS&T International Symposium on Electronic Imaging 2019, Autonomous Vehicles and Machines Conference 2019, Total 5 pages.

Zhang et al., "A New Human Eye Tracking Method Based on Tracking Module Feedback TLD Algorithm," IEEE, Computer Society, 2018 IEEE 20th International Conference on High Performance Computing and Communications; IEEE 16th International Conference on Smart City; IEEE 4th Intl. Conference on Data Science and Systems, Total 7 pages.

Communication dated May 21, 2024, issued by the Japanese Patent Office in Japanese Application No. 2020-134567.

Communication issued on Oct. 31, 2023 by the National Intellectual Property Administration of P.R. China in Chinese Patent Application No. 202010650136.2.

Communication dated Sep. 20, 2024, issued by the Korean Intellectual Property Office in Korean Application No. 10-2019-0104570.

\* cited by examiner

IMAGE PROCESSING METHOD AND APPARATUS

CROSS-REFERENCE TO RELATED APPLICATION

This application is a continuation application of U.S. application Ser. No. 17/728,308, filed Apr. 25, 2022, which is a continuation of U.S. application Ser. No. 16/890,114, filed Jun. 2, 2020 (now U.S. Pat. No. 11,315,261 issued Apr. 26, 2022), which claims priority from Korean Patent Application No. 10-2019-0104570, filed on Aug. 26, 2019 in the Korean Intellectual Property Office, the disclosure of which is herein incorporated by reference in its entirety.

BACKGROUND

1. Field

Methods and apparatuses consistent with example embodiments relate to an image processing method and an image processing apparatus.

2. Description of Related Art

Camera-based eye tracking technology is applicable in a number of fields such as, for example, a viewpoint tracking-based autostereoscopic three-dimensional (3D) super-multiview display, and/or a head-up display (HUD). The performance of camera-based eye tracking technology depends on the image quality of a camera and/or performance of an eye tracking method. The stability of operation of camera-based eye tracking technology decreases in an environment in which illuminance drastically changes, for example, in a driving environment, due to a backlight, a strong sunlight, a dark and low-illuminance environment, a tunnel passing during driving, and/or a motion of a driver. Considering a driving environment in which an augmented reality (AR) 3D HUD may be used, there is a demand for a method that, in response to failure of tracking of eyes of a user due to a motion of the user or an influence of illuminance, can quickly redetect positions of eyes and acquire coordinates of the eyes.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

One or more example embodiments provide a method in which, in response to failure of tracking of a face or eyes of a user due to a motion of the user or an influence of illuminance, positions of eyes may be quickly redetected and coordinates of the eyes are obtained. Therefore, accuracy and speed in tracking a face or eyes of a user may be improved.

In accordance with an aspect of an example embodiment, there is provided an image processing method including: acquiring an image frame; tracking a face region of a user based on first prior information obtained from at least one previous frame of the image frame; based on a determination that tracking of the face region based on the first prior information has failed, setting a scan region in the image frame based on second prior information obtained from the at least one previous frame; and detecting the face region in the image frame based on the scan region.

The second prior information may include information related to at least one previous scan region based on which detection of the face region is performed in the at least one previous frame, and the setting may include resetting the scan region to a region to which the at least one previous scan region is expanded.

The resetting may include resetting the scan region by sequentially expanding a size of a window for setting a previous scan region, based on whether tracking of the face region in the previous scan region has failed.

The resetting of the scan region by sequentially expanding the size of the window may include: sequentially expanding the size of the window for setting the previous scan region based on a number of times tracking of the face region in the previous scan region has failed; and resetting the scan region based on the sequentially expanded size of the window.

The sequentially expanding the size of the window based on the number of times the tracking of the face region has failed may include at least one of expanding the size of the window to a size of a first window to which the previous scan region is expanded upward, downward, leftward, and rightward, based on a determination that the tracking of the face region has failed one time; expanding the size of the window to a size of a second window to which a scan region based on the first window is expanded leftward and rightward, based on a determination that the tracking of the face region has failed two times; and expanding the size of the window to a size of a third window to which a scan region based on the second window is expanded upward and downward, based on a determination that the tracking of the face region has failed three times.

The image processing method may further include setting an initial scan window corresponding to the scan region based on pupil center coordinates of the user accumulated in the at least one previous frame.

The image processing method may further include selecting an initial scan window corresponding to the scan region from among a plurality of candidate windows based on feature parts of a face of the user included in the image frame; and setting an initial scan region based on the initial scan window.

The selecting may include selecting the initial scan window from among the plurality of candidate windows based on statistical position coordinates of the user and a position of a camera used to capture the image frame.

The tracking may include aligning a plurality of predetermined feature points at a plurality of feature parts included in the face region; and tracking a face of the user based on the aligned plurality of predetermined feature points.

The aligning may include mapping the plurality of predetermined feature points based on image information in the face region.

The aligning may include aligning the plurality of predetermined feature points at the plurality of feature parts included in the face region and a neighboring region of the face region.

The first prior information may include at least one of pupil center coordinates of the user accumulated in the at least one previous frame, position coordinates of feature points corresponding to a face of the user in the at least one previous frame, and position coordinates of feature points corresponding to eyes and a nose of the user in the at least one previous frame.

The tracking may include generating a tracking map corresponding to the face region based on the first prior information; and tracking the face region of the user based on the tracking map.

The generating may include generating the tracking map based on a movable range of the face region in the image frame based on the first prior information.

The image processing method may further include outputting information related to the detected face region of the user.

The outputting may include outputting information related to at least one of positions of a pupil and a nose included in the scan region, a viewpoint by the position of the pupil, and a facial expression of the user represented in the scan region.

The image frame may include at least one of a color image frame and an infrared image frame.

In accordance with an aspect of an example embodiment, there is provided a non-transitory computer-readable storage medium storing instructions that, when executed by at least one processor, cause the at least one processor to perform the image processing method.

In accordance with an aspect of an example embodiment, there is provided an image processing apparatus including: a sensor configured to acquire an image frame; a processor configured to: track a face region of a user based on first prior information obtained from at least one previous frame of the image frame; based on a determination that tracking of the face region based on the first prior information has failed, set a scan region in the image frame based on second prior information obtained from the at least one previous frame; and detect the face region in the image frame based on the scan region; and a display configured to output information related to the detected face region of the user.

The second prior information may include information related to at least one previous scan region based on which detection of the face region is performed in the at least one previous frame, and the processor may be further configured to reset the scan region to a region to which the at least one previous scan region is expanded.

The processor may be further configured to, based on whether tracking of the face region in a previous scan region has failed, reset the scan region by sequentially expanding a size of a window for setting the previous scan region.

The processor may be further configured to sequentially expand the size of the window for setting the previous scan region based on a number of times tracking of the face region in the previous scan region has failed, and reset the scan region based on the sequentially expanded size of the window.

The processor may be further configured to perform at least one of: expanding the size of the window to a size of a first window to which the previous scan region is expanded upward, downward, leftward, and rightward, based on a determination that tracking of the face region in the previous scan region has failed one time, expanding the size of the window to a size of a second window to which a scan region based on the first window is expanded leftward and rightward, based on a determination that the tracking of the face region has failed two times, and expanding the size of the window to a size of a third window to which a scan region based on the second window is expanded upward and downward, based on a determination that the tracking of the face region has failed three times.

The processor may be further configured to set an initial scan window corresponding to the scan region based on pupil center coordinates of the user accumulated in the at least one previous frame.

The processor may be further configured to select an initial scan window corresponding to the scan region from among a plurality of candidate windows based on feature parts of a face of the user included in the image frame, and set an initial scan region based on the initial scan window.

The processor may be further configured to select the initial scan window from among the plurality of candidate windows based on statistical position coordinates of the user and a position of a camera used to capture the image frame.

The processor may be further configured to align a plurality of predetermined feature points at a plurality of feature parts included in the face region, and track a face of the user based on the aligned plurality of predetermined feature points.

The processor may be further configured to map the plurality of predetermined feature points based on image information in the face region.

The processor may be further configured to align the plurality of predetermined feature points at the plurality of feature parts included in the face region and a neighboring region of the face region.

The first prior information may include at least one of pupil center coordinates of the user accumulated in the at least one previous frame, position coordinates of feature points corresponding to a face of the user in the at least one previous frame, and position coordinates of feature points corresponding to eyes and a nose of the user in the at least one previous frame.

The processor may be further configured to generate a tracking map corresponding to the face region based on the first prior information, and track the face region of the user based on the tracking map.

The processor may be further configured to generate the tracking map based on a movable rage of the face region in the image frame based on the first prior information.

The display may be further configured to output information related to at least one of positions of a pupil and a nose included in the scan region, a viewpoint by the position of the pupil, and a facial expression of the user represented in the scan region.

The image frame may include at least one of a color image frame and an infrared image frame.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
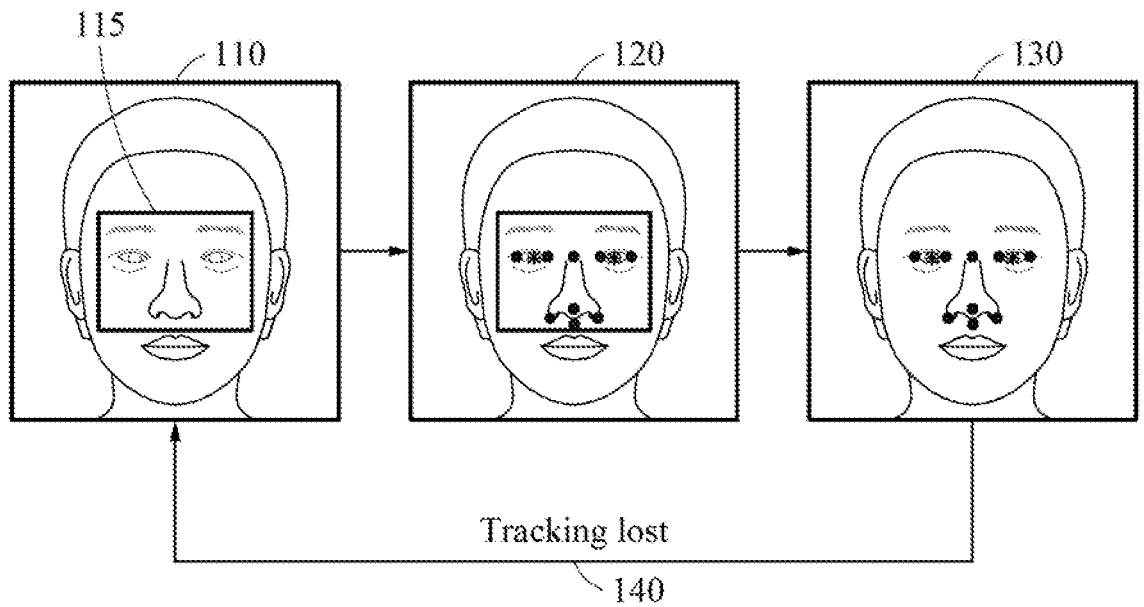
FIG. 1 illustrates a process of tracking and detecting a face region according to an example embodiment.

Hereinafter, example embodiments will be described in detail with reference to the accompanying drawings. The scope of the disclosure, however, should not be construed as limited to the example embodiments set forth herein. Like reference numerals in the drawings refer to like elements throughout the present disclosure.

Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The example embodiments set forth hereinafter may be utilized an autostereoscopic three-dimensional (3D) monitor, an autostereoscopic 3D tablet/smart phone, and a 3D head-up display (HUD) to output coordinates of eyes by tracking the eyes of a user using an infrared (IR) camera or an RGB camera. Further, the example embodiments may be implemented in the form of a software algorithm in a chip of the monitor, or implemented in the form of an app on the tablet/smart phone, or implemented as an eye tracking apparatus. The example embodiments may be applicable to, for example, an autonomous vehicle, an intelligent vehicle, a smart phone, and a mobile device. Hereinafter, example embodiments will be described in detail with reference to the accompanying drawings. In the drawings, like reference numerals are used for like elements.

FIG. 1 illustrates a process of tracking and detecting a face region according to an example embodiment. Referring to FIG. 1, a process of detecting a face region by scanning an image frame 110, and tracking eyes and a nose included in the face region, performed in an image processing apparatus, is illustrated.

It is assumed that, in an application for tracking a face principally based on pupils or eyes and a nose, an eye detector may fail tracking of eyes or an eye region in the image frame 110. When the tracking of the eyes of the user in the image frame 110 has failed, the image processing apparatus may detect an eye and nose region of the user using a scan window 115, as shown in an image 120. The scan window 115 may correspond to a window for setting a scan region in an image frame, which will be described further below.

The image processing apparatus may align, at positions corresponding to a face, a plurality of predetermined feature points corresponding to an eye region and a nose region included in the scan window 115 in the image 120. The plurality of predetermined feature points may be, for example, features points corresponding to key points representing features of the face, such as the eyes and the nose. For example, the plurality of feature points may be indicated as dots (•) and/or asterisks (*) as shown in the image 120 and an image 130 or as other various marks. In an example embodiment of FIG. 1, eleven feature points are aligned at corresponding positions of a face.

The image processing apparatus may extract pupils of the user and/or a face region of the user, as shown in the image 130, by tracking the face of the user based on the plurality of feature points aligned in the image 120.

When the extraction of the pupils of the user and/or the extraction of the face region of the user from the image 130 has failed, the image processing apparatus may rescan the image frame 110, in operation 140.

When rescanning is performed to detect the face region in response to face tracking being failed (tracking lost), the image processing apparatus may restrict a scan region for detecting the eyes or the eye region in the image frame based on prior information (for example, a previous detected face region or scan region), rather than scanning the entire image frame, thereby improving the rate (or speed) of detecting an eye coordinate. In an example embodiment in which a driver in a vehicle is captured by using a camera of which position in the vehicle is fixed and that a movement range of the driver is in the limited range, the scan region in the image frame may be restricted, and thus the rate of eye or face detection may improve. Further, according to an example embodiment, when detection of the face region in the restricted scan region has failed, the size of a window for resetting the scan region may be sequentially expanded, which may reduce the latency in detecting the eye coordinate.

Figure 2:
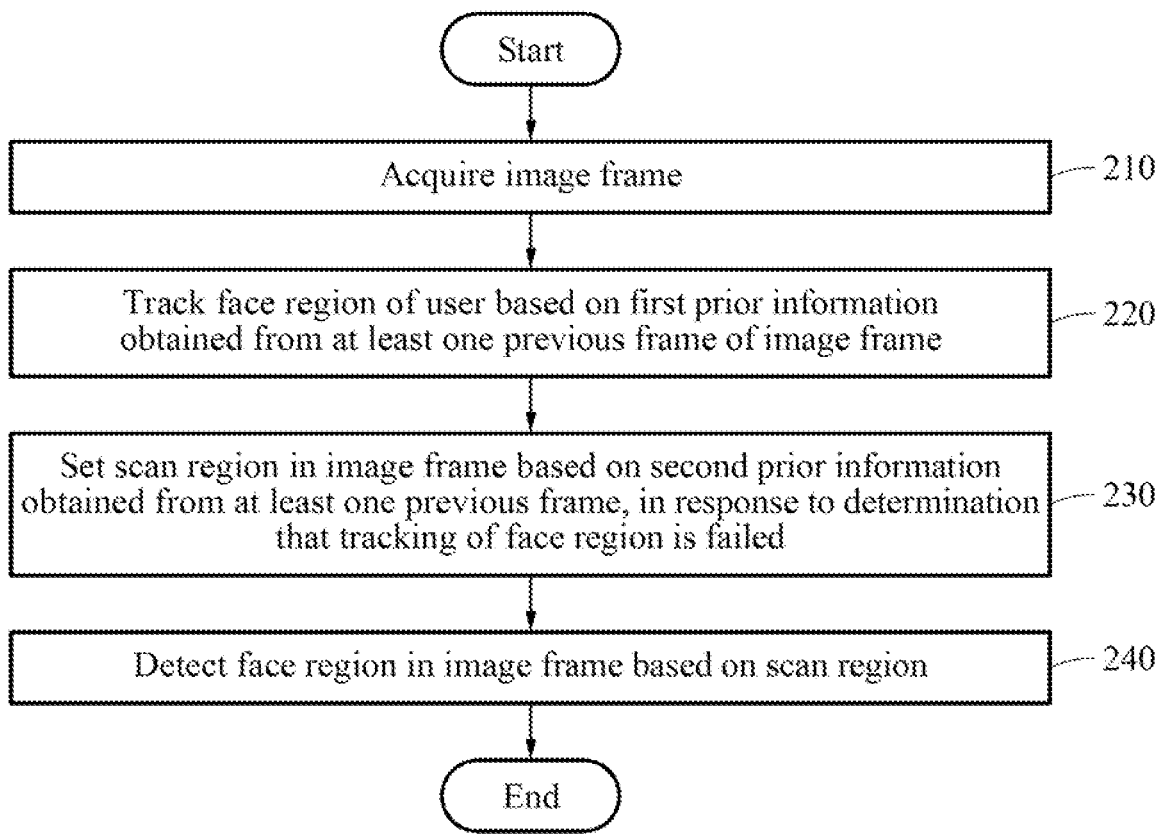
FIGS. 2, 3, and 4 are flowcharts illustrating image processing methods according to an example embodiment.

FIG. 2 is a flowchart illustrating an image processing method according to an example embodiment. Referring to FIG. 2, in operation 210, an image processing apparatus may acquire an image frame. The image frame may include, for example, a color image frame and/or an IR image frame. The image frame may correspond to, for example, an image of a driver captured by an image sensor or a camera provided in a vehicle.

In operation 220, the image processing apparatus may track a face region of a user based on first prior information obtained from at least one previous frame of the obtained image frame. If the image frame is acquired at a timepoint t, the at least one previous frame may be acquired at a timepoint, for example, t−1, or timepoints, for example, t−1, t−2, and t−3, earlier than the timepoint t at which the image frame is acquired. The first prior information may include, for example, at least one of pupil center coordinates of the user accumulated in the at least one previous frame, position coordinates of feature points corresponding to a face of the user in the at least one previous frame, and position coordinates of feature points corresponding to eyes and a noses of the user in the at least one previous frame.

In operation 220, the image processing apparatus may align a plurality of predetermined feature points at a plurality of feature parts of the face region, and track the face of the user based on the aligned plurality of feature points. The "plurality of feature parts" may be partial parts or regions included in the face region of the image frame, and include, for example, eyes, a nose, a mouth, eyebrows, and eyeglasses. In this example, the image processing apparatus may align the plurality of feature points in the face region and/or at the plurality of feature parts included in a neighboring region of the face region. The image processing apparatus may move (or map) the plurality of predetermined feature points based on image information in the face region.

In operation 220, the image processing apparatus may determine whether tracking of the face region of the user succeeds or has failed based on the first prior information. An example of tracking a face region by the image processing apparatus will be described in detail with reference to FIG. 7.

In operation 230, the image processing apparatus may set a scan region in the image frame based on second prior information obtained from the at least one previous frame, in response to determination that tracking of the face region has failed. The second prior information may include, for example, information related to at least one previous scan region based on which detection of the face region is performed in the at least one previous frame. The at least one previous scan region may be, for example, at least one initial scan region set in an initial scan window.

Hereinafter, for ease of description, a window for setting a scan region in an image frame will be referred to as a "scan window", and a scan window initially used to set a scan region in the image frame will be referred to as an "initial scan window". The scan region set by the initial scan window will be referred to as an "initial scan region". An example of setting the position and the size of the initial scan window will be described in detail with reference to FIG. 5.

In an example, "setting a scan region" may include setting a scan region, setting an initial scan region, or adjusting or resetting a scan region.

In operation 230, the image processing apparatus may reset the scan region to a region to which the previous scan region is expanded. The image processing apparatus may reset the scan region by sequentially expanding the size of a window for setting the scan region, based on whether tracking of the face region in the scan region has failed. An example of setting or resetting a scan region by the image processing apparatus will be described in detail with reference to FIG. 6.

In operation 240, the image processing apparatus may detect the face region in the image frame based on the set scan region. In an example, the image processing apparatus may output information related to the detected face region. The information related to the face region of the user may include, for example, positions of pupils and a nose included in the scan region, a viewpoint by the positions of the pupils, and a facial expression of the user represented in the scan region. The image processing apparatus may explicitly or implicitly output the information related to the face region. The expression "explicitly outputting the information related to the face region" means performing an operation that may include, for example, displaying the positions of the pupils included in the face region and/or the facial expression represented in the face region on a screen, and/or outputting information about the positions of the pupils included in the face region and/or the facial expression represented in the face region on a screen by audio. The expression "implicitly outputting the information related to the face region" means performing an operation that may include, for example, adjusting an image displayed on a HUD based on the positions of the pupils included in the face region, or a viewpoint by the positions of the pupils, or providing a service corresponding to the facial expression represented in the face region.

Figure 3:
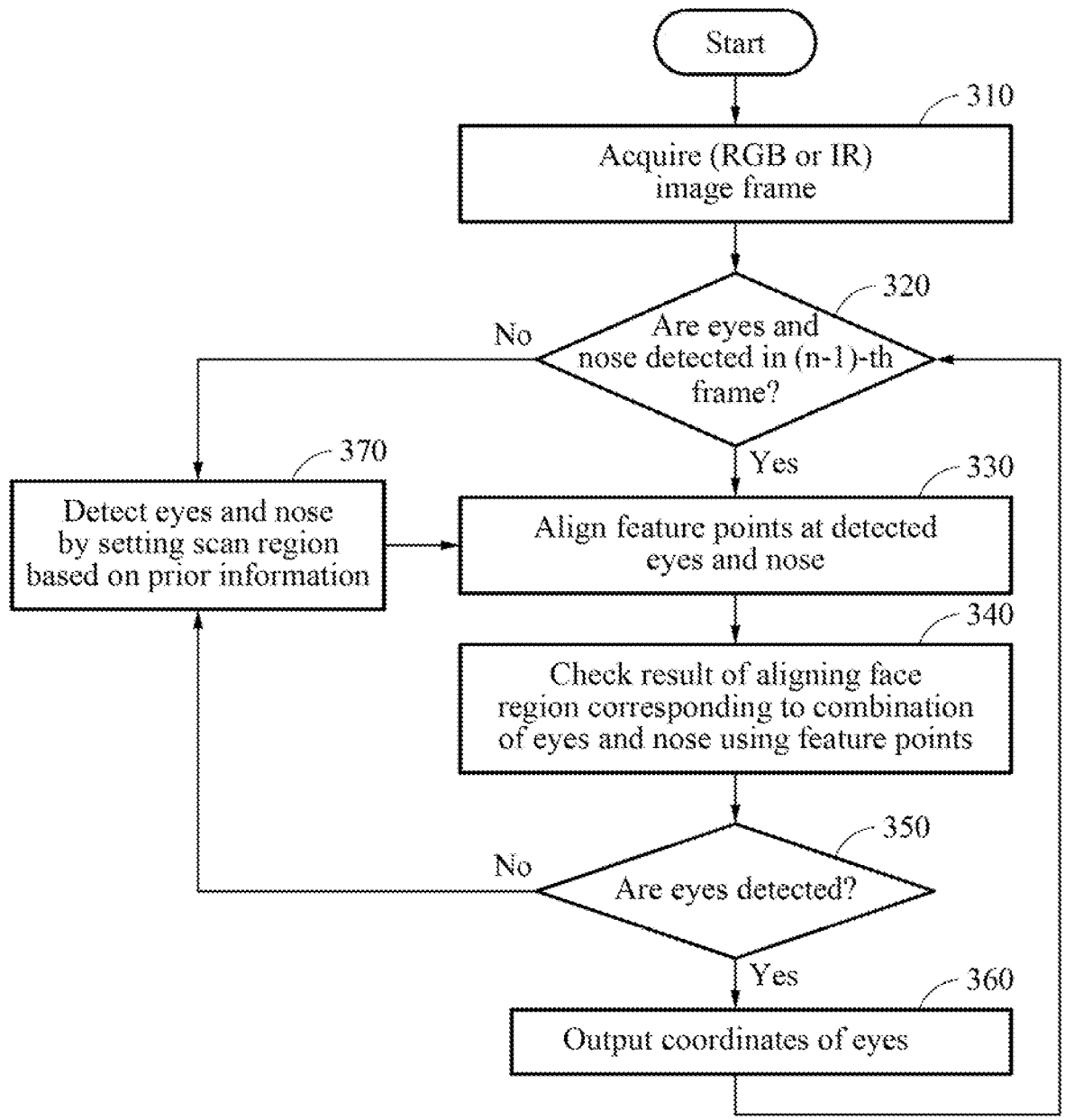

FIG. 3 is a flowchart illustrating an image processing method according to an example embodiment. Referring to FIG. 3, in operation 310, an image processing apparatus may acquire an n-th image frame from a camera. The image frame may be, for example, an RGB color image frame or an IR image frame.

In operation 320, the image processing apparatus may determine whether eyes and a nose are detected in a previous (n−1)-th image frame. The image processing apparatus may determine whether the eyes and the nose are detected in an initial scan region of the previous (n−1)-th image frame. In response to determination that the eyes and the nose are not detected in operation 320, the image processing apparatus may detect the eyes or the eyes and the nose by setting or adjusting a scan region based on prior information, in operation 370. The image processing apparatus may align predetermined feature points (e.g., eleven feature points as shown in FIG. 1) at the detected eyes or the detected eyes and nose, in operation 330.

On the other hand, in response to determination that the eyes and nose are detected in operation 320, the image processing apparatus may align, for example, predetermined feature points at the detected eyes or the detected eyes and nose in operation 330. For example, the image processing apparatus may align predetermined feature points at a plurality of feature parts of the detected eyes or the detected eyes and nose included in the scan region or a neighboring region of the scan region, in operation 330. The predetermined feature points may include, for example, three feature points of each eye, one feature point between the eyes, one feature point at the tip of the nose, and three feature points of the mouth (or three feature points of the nose).

In operation 330, the image processing apparatus may align a plurality of feature points at a plurality of feature parts included in the face region and a neighboring region of the face region. The image processing apparatus may move (or map) the plurality of predetermined feature points to be aligned at the plurality of feature parts based on image information in the face region. The image processing apparatus may recognize the positions of the feature parts corresponding to the eyes and the nose of the user from the face region of the image frame, based on various methods such as, for example, Supervised Descent Method (SDM) which aligns feature points on the shape of an image using descent vectors learned from an initial shape configuration, Active Shape Model (ASM) which aligns feature points based on the shape and a principal component analysis (PCA) of the shape, Active Appearance Model (AAM), or Constrained Local Models (CLM). The image processing apparatus may move the plurality of predetermined feature points to be aligned at the positions of the recognized plurality of feature parts. For example, when the image frame is an initial image frame, the plurality of feature points yet to be aligned may correspond to average positions of feature parts of a plurality of users. In addition, when the image frame is not an initial image frame, the plurality of feature points yet to be aligned may correspond to a plurality of feature points aligned based on a previous image frame.

In operation 340, the image processing apparatus may check an alignment result corresponding to a combination of the plurality of feature parts aligned with the feature points. The image processing apparatus may check an alignment result of a face region corresponding to a combination of a plurality of feature parts, for example, the eyes and nose, in the scan region, based on information in the scan region.

The image processing apparatus may check whether the plurality of feature parts in the scan region is a class corresponding to the combination of the eyes and the nose, based on the image information in the scan region. The image processing apparatus may check whether the scan region is a face class using a checker, for example, based on Scale Invariant Feature Transform (SIFR) features. Here, the "SIFR features" may be obtained through the following two operations. The image processing apparatus may extract candidate feature points having locally maximum or minimum brightness of the image in a scale space by an image pyramid from image data of the scan region, and select feature points to be used for image matching by filtering feature points having low contrast. The image processing apparatus may obtain direction components based on a gradient of a neighboring region about the selected feature points, and generate descriptors by resetting a region of interest about the obtained direction components and detecting the size of the feature points. Here, the descriptors may correspond to SIFR features. Further, if the features points, corresponding to key points of eyes and nose of each face stored in a training image database (DB), are aligned in a face region of a training image frame, the "checker" may be a classifier trained with the SIFT features extracted from aligned feature points. The checker may check whether the face region in which the feature points are aligned corresponds to a real face class, based on the image information in the face region of the image frame. The checker may be, for example, a support vector machine classifier. The checker may also be referred to as a "face checker" in that the checker checks an alignment with respect to a face region.

In operation 350, the image processing apparatus may determine whether eyes are detected as a result of the checking in operation 340. In response to determination that eyes are not detected in operation 350, the image processing apparatus may detect the eyes or the eyes and the nose by setting the scan region based on prior information, in operation 370.

In response to determination that eyes are detected, the image processing apparatus may output coordinates of the eyes or coordinates of pupils, in operation 360.

Figure 4:
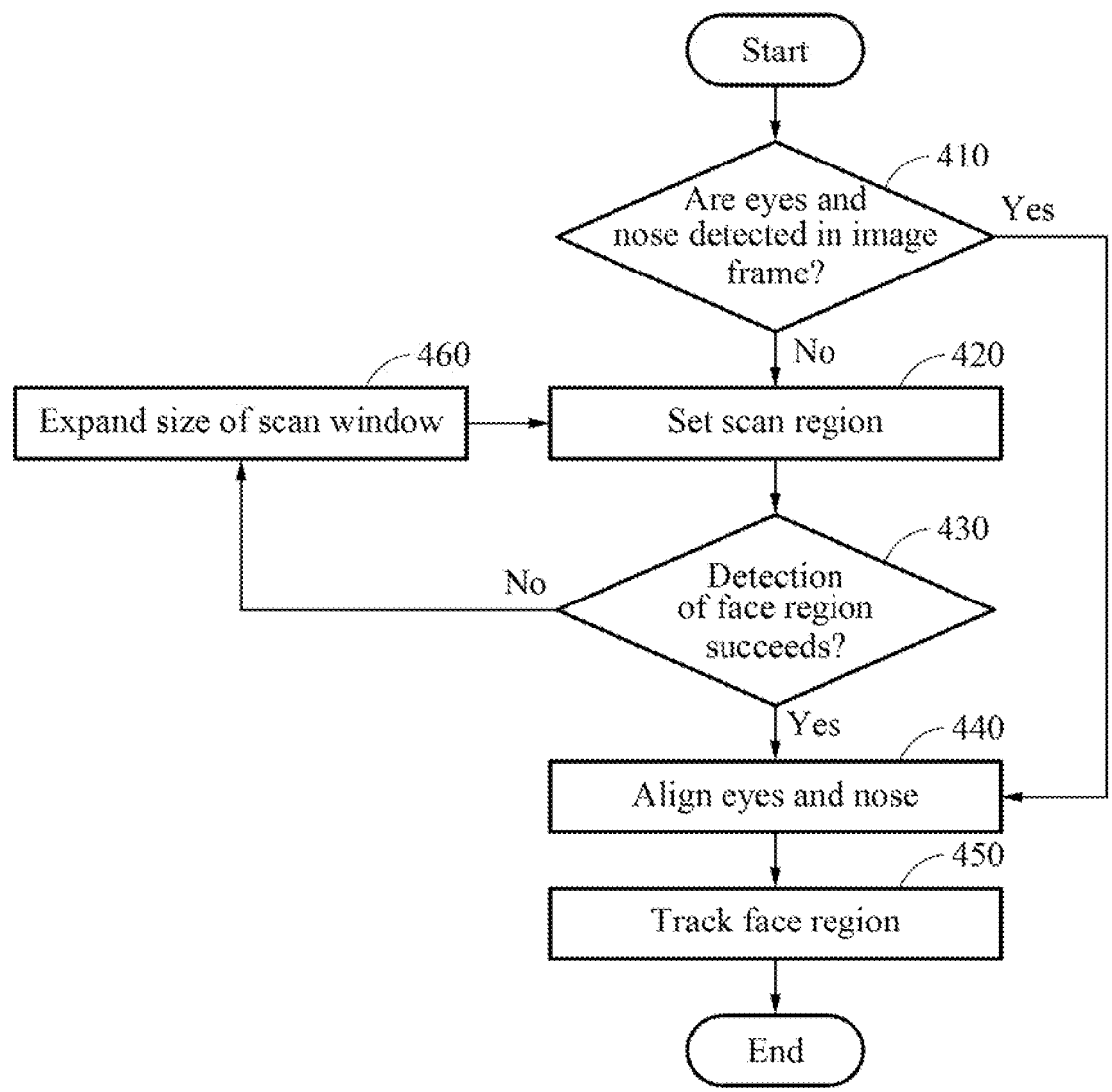

FIG. 4 is a flowchart illustrating an image processing method according to an example embodiment. Referring to FIG. 4, in operation 410, an image processing apparatus may determine whether a face region including eyes and a nose is detected in an image frame, for example, an n-th frame. In response to determination that eyes and a nose are detected, the image processing apparatus may align a plurality of predetermined feature points at a plurality of feature parts, for example, eyes, a nose, a middle part between the eyes, and pupils, of the face region, in operation 440. In operation 450, the image processing apparatus may track the face region of the user based on the aligned plurality of feature points.

On the other hand, in response to determination that the face region is not detected, the image processing apparatus may set a scan region in the image frame based on prior information obtained from at least one previous frame (for example, an (n−1)-th frame) of the image frame, in operation 420. The scan region may be set by a window for setting the scan region.

In operation 430, the image processing apparatus may determine whether the face region is detected in the set scan region, that is, whether detection of the face region succeeds in the image frame (for example, the n-th frame) by using the set scan region. In response to determination that the detection of the face region succeeds, the image processing apparatus may align a plurality of predetermined feature points at a plurality of feature parts of the face region, in operation 440. In operation 450, the image processing apparatus may track the face region of the user based on the aligned plurality of feature points.

In response to determination that the detection of the face region has failed, the image processing apparatus may reset the scan region by sequentially expanding the size of the window for setting the scan region. In response to the determination that the detection of the face region has failed in operation 430, the image processing apparatus may expand the size of the scan window, in operation 460. In operation 460, the image processing apparatus may reset the scan region by sequentially expanding the size of the window for setting the scan region, based on whether tracking of the face region in the scan region has failed. In operation 420, the image processing apparatus may reset the scan region based on the sequentially expanded size of the window. The image processing apparatus may reset the scan region by repeating the sequential expansion of the size of the scan window based on the number of times tracking of the face region in the scan region has failed. For example, the image processing apparatus may reset the scan region may sequentially expand the size of the scan window each time tracking of the face region in the scan region has failed. The iteration count of expanding the size of the scan window may be determined by the user to be a predetermined count, for example, three or four times. The repeating may be performed until tracking of the face region in the scan region succeeds. In other words, it may be possible that the size of the scan window is expanded to the entire image frame. An example of setting or resetting the scan region by the image processing apparatus will be described in detail with reference to FIG. 6.

Figure 5:
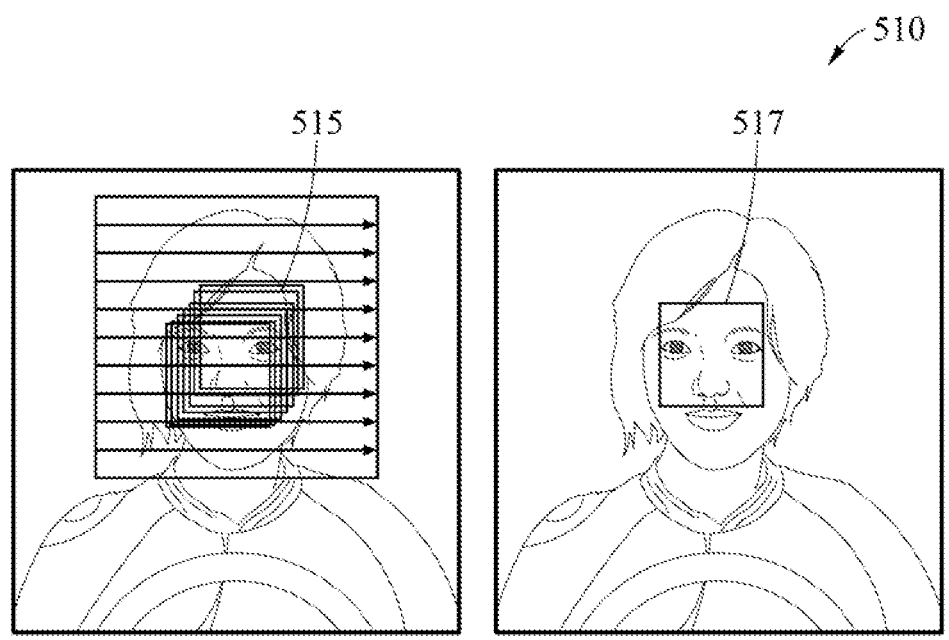
FIG. 5 illustrates an example of setting a position of an initial scan window according to an example embodiment.

FIG. 5 illustrates an example of setting a position of an initial scan window according to an example embodiment. Referring to FIG. 5, an example of setting an initial scan window 517 in an image frame 510 is illustrated.

The image processing apparatus may select the initial scan window 517 corresponding to a scan region from among a plurality of candidate windows 515, based on feature parts of a face of a user included in a face region of the image frame 510, for example, eyes, a nose, a mouth, eyebrows, and eyeglasses. The image processing apparatus may select the initial scan window 517 from among the plurality of candidate windows 515, based on statistical position coordinates of the user and a position of a camera used to capture the image frame 510. In an example of face detection in a driving environment, the statistical position coordinates of the user may correspond to, for example, position coordinates that average position coordinates to which a user sitting on a driver seat of a vehicle may move on average. The image processing apparatus may set an initial scan region based on the position of the initial scan window 517.

In an example embodiment, the image processing apparatus may set the initial scan window 517 for the image frame based on pupil center coordinates of the user accumulated in at least one previous frame. The image processing apparatus may set the initial scan window 517, for example, in a region with left and right margins based on the pupil center coordinates of the user.

Figure 6:
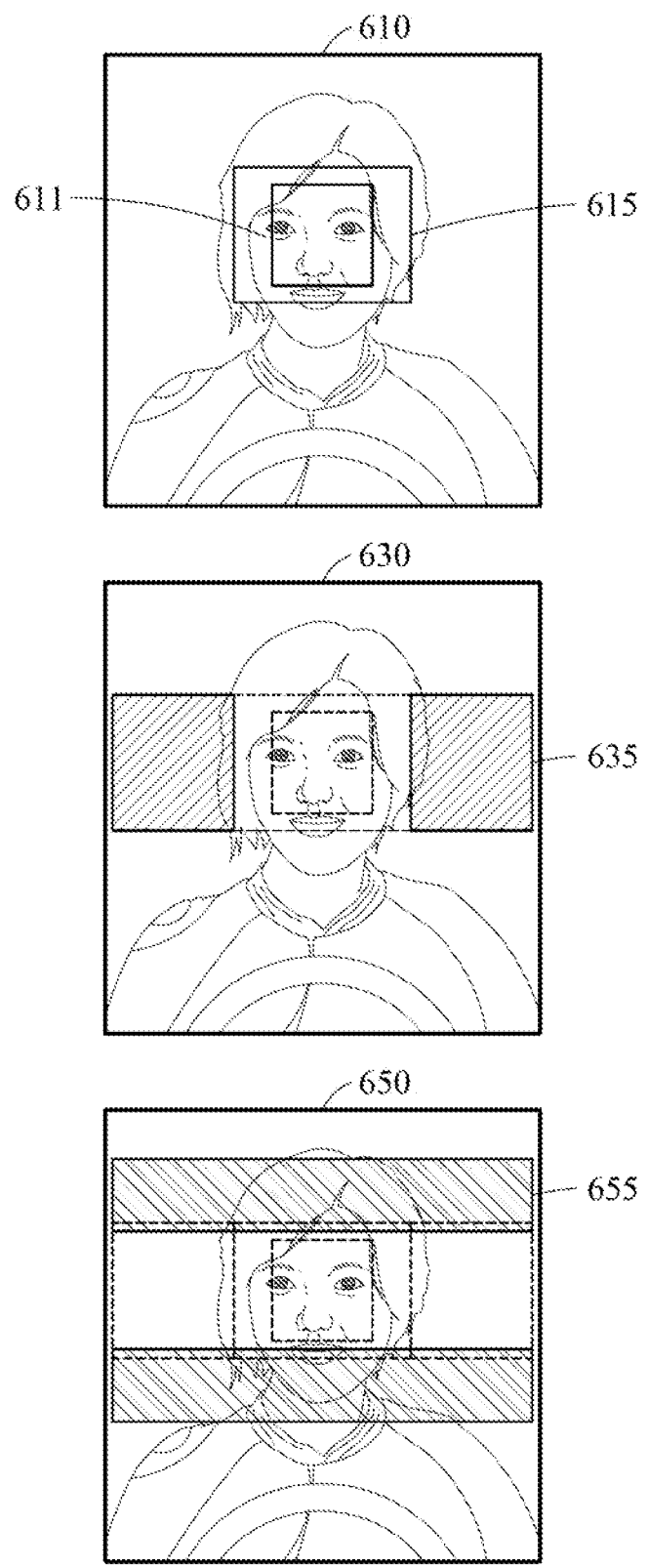
FIG. 6 illustrates an example of setting a scan region according to an example embodiment.

FIG. 6 illustrates an example of setting a scan region according to an example embodiment. Referring to FIG. 6, an initial scan window 611, an image 610 in which a first window 615 is set, an image 630 in which a second window 635 is set, and an image 650 in which a third window 655 is set, are illustrated.

An image processing apparatus may set a scan region by sequentially expanding the size of a window for setting the scan region, based on whether tracking of a face region in the scan region has failed.

If tracking of the face region by the scan window has failed one time, the image processing apparatus may expand the size of the scan window to the size of the first window 615, as shown in the image 610. For example, the size of the first window 615 may correspond to the size of the initial scan region expanded upward, downward, leftward, and rightward from the initial scan window 611 of FIG. 6. In detail, the size of the first window 615 may correspond to the size of the initial scan region 611 expanded upward, downward, leftward, and rightward by, for example, 5%.

If tracking of the face region has failed two times, the image processing apparatus may expand the size of the scan window to the size of the second window 635, as shown in the image 630 of FIG. 6. For example, the size of the second window 635 may correspond to the size of the scan region expanded leftward and rightward based on the first window 615 of FIG. 6. In detail, the size of the second window 635 may correspond to the size of the first window 615 expanded leftward and rightward by "a distance from a middle part between eyes to each eye in the initial scan window 611+a predetermined margin, for example, 2 mm". For example, the distance from the middle part between the eyes to a right eye (or a left eye) may be 3.5 cm, and this distance may be obtained by averaging distances from the middle part between the eyes to a right eye (or a left eye) of a plurality of users. In this example, the size of the second window 635 may correspond to the size of the first window 615 expanded leftward and rightward by 3.7 cm.

If tracking of the face region has failed three times, the image processing apparatus may expand the size of the scan window to the size of the third window 655, as shown in the image 650 of FIG. 6. For example, the size of the third window 655 may correspond to the size of the scan region expanded upward and downward based on the second window 635 of FIG. 6. In detail, the size of the third window 655 may correspond to the size of the second window 635 expanded upward and downward by "a distance from a middle part between eyes to each eye in the initial scan window 611+a predetermined margin, for example, 2 mm". For example, the distance from the middle part between the eyes to a right eye (or a left eye) may be 3.5 cm. In this example, the size of the third window 655 may correspond to the size of the second window 635 expanded upward and leftward by 3.7 cm.

Although it is described in FIG. 6 that the size of the first window 615 corresponds to the size of the initial scan window 611 expanded upward, downward, leftward, and rightward, the size of the second window 635 corresponds to the size of the first window 615 expanded leftward and rightward, and the size of the third window 655 corresponds to the size of the second window 635 expanded upward and downward, these are merely examples given for illustrative purposes and the disclosure is not limited to the directions of expansion described herein. It should be understood that the window may be expanded in any direction of upward, downward, leftward, and rightward or any combination thereof, or any other direction.

Figure 7:
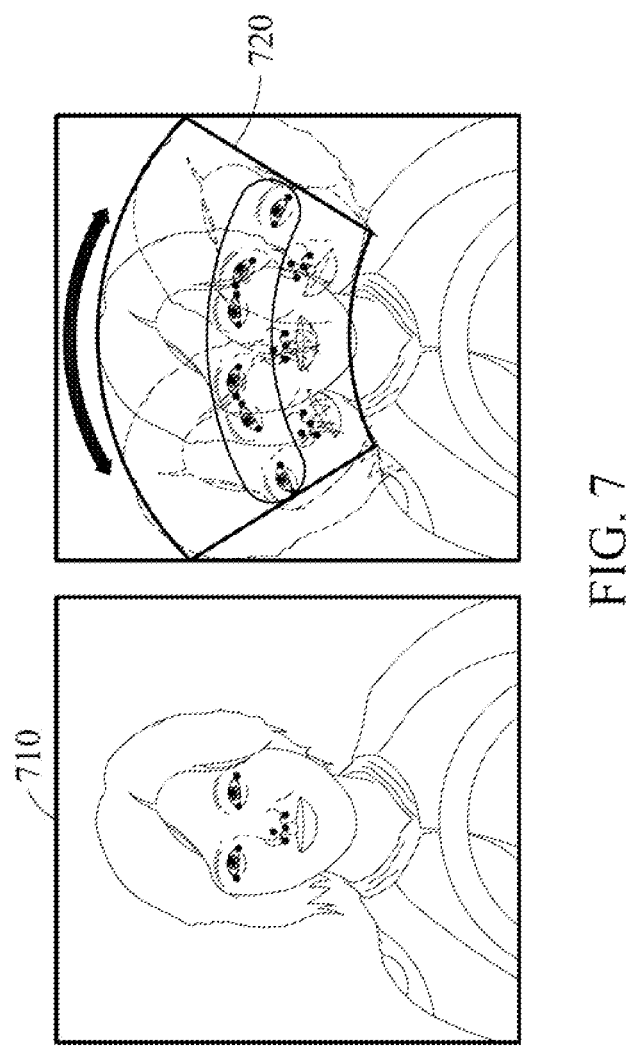
FIG. 7 illustrates an example of tracking a face region of a user according to an example embodiment.

FIG. 7 illustrates an example of tracking a face region of a user according to an example embodiment. Referring to FIG. 7, an image frame 710, and a tracking map 720 generated based on a previous frame of the image frame 710 are illustrated.

An image processing apparatus may generate the tracking map 720 corresponding to a face region of the image frame 710, based on prior information, for example, first prior information, obtained from at least one previous frame of the image frame 710. The first prior information may include, for example, at least one of pupil center coordinates of a user accumulated in the at least one previous frame, position coordinates of feature points corresponding to a face of the user in the at least one previous frame, and position coordinates of feature points corresponding to eyes and a nose of the user in the at least one previous frame.

The image processing apparatus may determine a moving range of the face region movable in the image frame 710 based on the first prior information, for example. The moving range of the face region may include a moving range of the face region for a case in which a driver sitting in a driver seat moves an upper body or a head left and right, and a moving range of the face region for a case in which the driver turns the upper body or the head back and forth.

The image processing apparatus may generate the tracking map 720 based on the moving range of the face region. The tracking map 720 may include coordinates corresponding to a maximum moving range of the face region with respect to upward, downward, leftward, and rightward directions in which the face region is movable. The image processing apparatus may track the face region of the user based on the tracking map 720.

Figure 8:
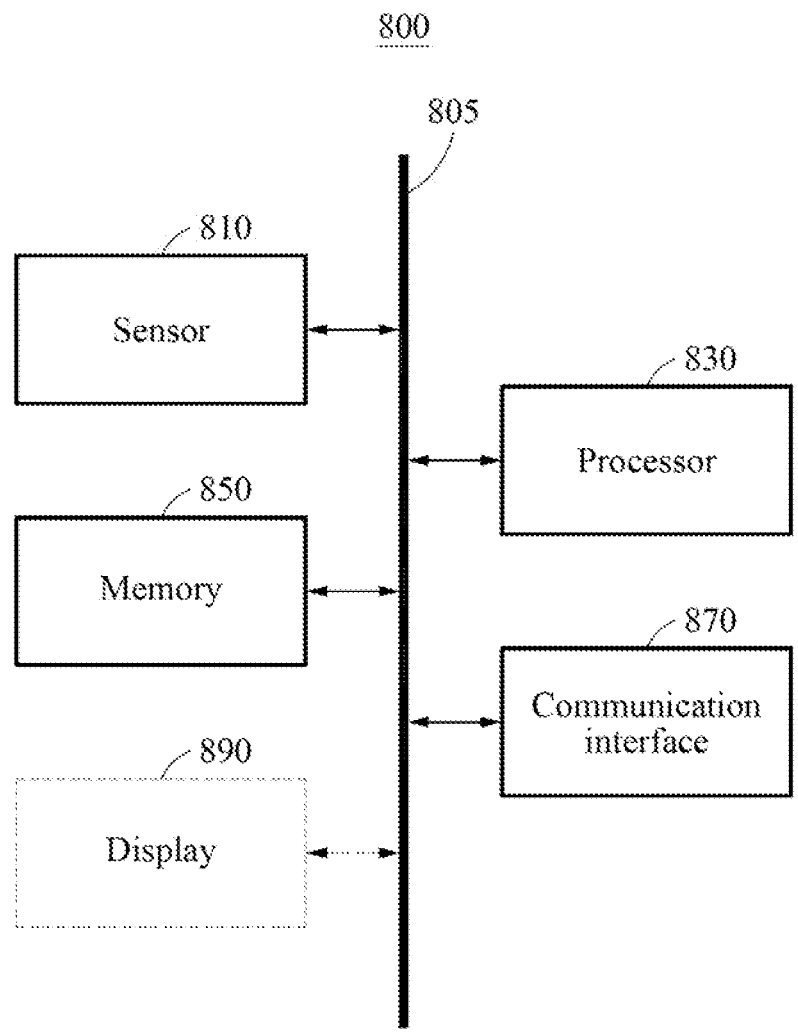
FIG. 8 is a block diagram illustrating an image processing apparatus according to an example embodiment.

FIG. 8 is a block diagram illustrating an image processing apparatus according to an example embodiment. Referring to FIG. 8, an image processing apparatus 800 may include a sensor 810, a processor 830, a memory 850, a communication interface 870, and a display 890. The sensor 810, the processor 830, the memory 850, the communication interface 870, and the display 890 may communicate with each other through a communication bus 805.

The sensor 810 may acquire an image frame. The sensor 810 may be, for example, an image sensor, a vision sensor or an IR camera configured to capture an input image by IR radiation. The image frame may include, for example, a face image of a user or an image of a user driving a vehicle.

The processor 830 may track a face region of the user based on first prior information obtained from at least one previous frame of the image frame. The processor 830 may set a scan region in the image frame based on second prior information obtained from the at least one previous frame, in response to determination that tracking of the face region based on the first prior information has failed. The processor 830 may detect the face region in the image frame based on the scan region. A single processor 830 or a plurality of processors 830 may be provided.

The processor 830 may perform at least one method described through FIGS. 1 through 7 or an algorithm corresponding to the at least one method. The processor 830 may execute a program, and control the image processing apparatus 800. Program codes to be executed by the processor 830 may be stored in the memory 850. The processor 830 may be configured as, for example, a Central Processing Unit (CPU), a Graphics Processing Unit (GPU), or a Neural Network Processing Unit (NPU).

The memory 850 may store the image frame acquired by the sensor 810, the first prior information and second prior information obtained by the processor 830 from the at least one previous frame of the image frame, the face region of the user obtained by the processor 830, and/or the information related to the face region. Further, the memory 850 may store the information related to the face region detected by the processor 830. The memory 850 may be a volatile memory or a non-volatile memory.

The communication interface 870 may receive the image frame from an outside of the image processing apparatus 800. The communication interface 870 may output the face region detected by the processor 830 and/or the information related to the face region of the user. The communication interface 870 may receive an image frame captured outside of the image processing apparatus 800 or information of various sensors received from the outside of the image processing apparatus 800.

The display 890 may display a processing result obtained by the processor 830, for example, the information related to the face region of the user. For example, when the image processing apparatus 800 is embedded in a vehicle, the display 890 may be configured as a HUD.

The units described herein may be implemented using hardware components, software components, or a combination thereof. For example, a processing device may be implemented using one or more general-purpose or special purpose computers, such as, for example, a processor, a controller, an arithmetic logic unit, a digital signal processor, a microcomputer, a field programmable array, a programmable logic unit, a microprocessor, any other device capable of responding to and executing instructions in a defined manner. The processing device may run an operating system (OS) and one or more software applications that run on the OS. The processing device also may access, store, manipulate, process, and generate data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or semi-permanently in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The method according to the example embodiments described herein may be recorded in a non-transitory computer-readable medium including program instructions to implement various operations embodied by a computer. The medium may also include, alone or in combination, the program instructions, data files, data structures, and the like. The program instructions recorded on the medium may be those specially designed and constructed for the purposes embodied herein, or may be known to those having ordinary skill in the relevant art. Examples of non-transitory computer-readable medium include a magnetic medium such as a hard disk, a floppy disk, and a magnetic tape; an optical medium such as a compact disc (CD) a read-only memory (ROM) and a digital versatile disk (DVD); a magneto-optical medium such as a floptical disc; and hardware devices that are specially configured to store and perform program instructions, such as a ROM, a random access memory (RAM), a flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing method for a driver in a vehicle comprising:
    acquiring a face image of a driver from an infrared (IR) camera fixed in a vehicle;
    detecting a position of the driver's eyes in the face image;
    displaying an image on a three-dimensional (3D) head-up display (HUD) based on the position of the driver's eyes,
    wherein the detecting the position of the driver's eyes comprises:
    generating a tracking map corresponding to the driver's eyes based on the position of the driver's eyes; and
    tracking the driver's eyes based on the tracking map, and
    wherein the generating the tracking map comprises generating the tracking map based on a movable range of the driver's eyes in an image frame based on the position of the driver's eyes.

2. The image processing method of claim 1, wherein the detecting the position of the driver's eyes comprises:
    tracking the driver's eyes based on feature points corresponding to eyes obtained from at least one previous frame of the face image;
    based on a determination that tracking of the driver's eyes has failed, setting a scan region in the face image based on information related to at least one previous scan region based on which detection of the driver's eyes is performed in the at least one previous frame; and
    detecting the driver's eyes in the image frame based on the scan region.

3. The image processing method of claim 2, wherein the setting comprises resetting the scan region to a region to which the at least one previous scan region is expanded.

4. The image processing method of claim 3, wherein the resetting comprises resetting the scan region by sequentially expanding a size of a window for setting a previous scan region, based on whether tracking of the driver's eyes has failed.

5. The image processing method of claim 4, wherein the resetting of the scan region by sequentially expanding the size of the window comprises:
    sequentially expanding the size of the window for setting the previous scan region based on a number of times tracking of the driver's eyes in the previous scan region has failed; and
    resetting the scan region based on the sequentially expanded size of the window.

6. The image processing method of claim 5, wherein the sequentially expanding the size of the window based on the number of times the tracking of the driver's eyes has failed comprises at least one of:
- expanding the size of the window to a size of a first window to which the previous scan region is expanded upward, downward, leftward, and rightward, based on a determination that the tracking of the driver's eyes has failed one time;
- expanding the size of the window to a size of a second window to which a scan region based on the first window is expanded leftward and rightward, based on a determination that the tracking of the driver's eyes has failed two times; and
- expanding the size of the window to a size of a third window to which a scan region based on the second window is expanded upward and downward, based on a determination that the tracking of the driver's eyes has failed three times.

7. The image processing method of claim 2, further comprising:
- setting an initial scan window corresponding to the scan region based on pupil center coordinates of the driver accumulated in the at least one previous frame.

8. The image processing method of claim 2, further comprising:
- selecting an initial scan window corresponding to the scan region from among a plurality of candidate windows based on feature parts of a face of the driver included in the image frame; and
- setting an initial scan region based on the initial scan window.

9. The image processing method of claim 8, wherein the selecting comprises selecting the initial scan window from among the plurality of candidate windows based on statistical position coordinates of the driver and a position of the IR camera used to capture the face image.

10. The image processing method of claim 1, further comprising:
- outputting information related to the detected driver's eyes,
- wherein the information comprises information related to at least one of positions of a pupil and a nose included in a scan region, a viewpoint by the position of the pupil, and a facial expression of the driver represented in the scan region.

11. The image processing method of claim 1, wherein the face image comprises an infrared image frame.

12. A non-transitory computer-readable storage medium storing instructions that, when executed by at least one processor, cause the at least one processor to perform an image processing method comprising:
- acquiring a face image of a driver from an infrared (IR) camera fixed in a vehicle;
- detecting a position of the driver's eyes in the face image;
- displaying an image on a three-dimensional (3D) head-up display (HUD) based on the position of the driver's eyes,
- wherein the detecting the position of the driver's eyes comprises:
- generating a tracking map corresponding to the driver's eyes based on the position of the driver's eyes; and
- tracking the driver's eyes based on the tracking map, and
- wherein the generating the tracking map comprises generating the tracking map based on a movable range of the driver's eyes in an image frame based on the position of the driver's eyes.

13. An image processing apparatus comprising:
- an infrared (IR) camera configured to acquire a face image of a driver in a vehicle;
- a processor configured to:
- detect a position of the driver's eyes in the face image;
- display an image on a three-dimensional (3D) head-up display (HUD) based on the position of the driver's eyes,
- wherein the processor is further configured to, in detecting the position of the driver's eyes:
- generating a tracking map corresponding to the driver's eyes based on the position of the driver's eyes; and
- tracking the driver's eyes based on the tracking map, and
- wherein the generating the tracking map comprises generating the tracking map based on a movable range of the driver's eyes in an image frame based on the position of the driver's eyes.

14. The image processing apparatus of claim 13, wherein the processor is further configured to,
- track the driver's eyes based on feature points corresponding to eyes obtained from at least one previous frame of the face image;
- based on a determination that tracking of the driver's eyes has failed, set a scan region in the face image based on information related to at least one previous scan region based on which detection of the driver's eyes is performed in the at least one previous frame; and
- detect the driver's eyes in the image frame based on the scan region.

15. The image processing apparatus of claim 14, wherein the processor is further configured to reset the scan region to a region to which the at least one previous scan region is expanded.

16. The image processing apparatus of claim 15, wherein the processor is further configured to,
- sequentially expand a size of a window for setting a previous scan region based on a number of times tracking of the drive's eyes in the previous scan region has failed; and
- reset the scan region based on the sequentially expanded size of the window.

17. The image processing apparatus of claim 16, wherein the image processing apparatus comprises at least one of an autostereoscopic three-dimensional (3D) monitor, an autostereoscopic 3D tablet, an autostereoscopic 3D smart phone, a 3D head-up display (HUD) device, and the vehicle.

* * * * *